United States Patent
Brunner et al.

(10) Patent No.: US 9,573,166 B2
(45) Date of Patent: Feb. 21, 2017

(54) PROCESS FOR THE PRODUCTION OF A MULTI-LAYER COATING

(71) Applicant: AXALTA COATING SYSTEMS IP CO., LLC, Wilmington, DE (US)

(72) Inventors: Marcus Brunner, Wuppertal (DE); Axel Juengling, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 127 days.

(21) Appl. No.: 14/503,633

(22) Filed: Oct. 1, 2014

(65) Prior Publication Data

US 2015/0093512 A1 Apr. 2, 2015

(30) Foreign Application Priority Data

Oct. 2, 2013 (EP) ..................... 13187131
Oct. 2, 2013 (EP) ..................... 13187134
Oct. 2, 2013 (EP) ..................... 13187136

(51) Int. Cl.
| | |
|---|---|
| B05D 7/00 | (2006.01) |
| B05D 1/36 | (2006.01) |
| B05D 7/14 | (2006.01) |
| C09D 113/02 | (2006.01) |
| C09D 175/04 | (2006.01) |
| C08G 18/70 | (2006.01) |

(Continued)

(52) U.S. Cl.
CPC ............. B05D 7/572 (2013.01); B05D 1/36 (2013.01); B05D 7/14 (2013.01); C08G 18/706 (2013.01); C09D 113/02 (2013.01); C09D 175/04 (2013.01); *B05D 1/38* (2013.01); *B05D 3/0254* (2013.01); *B05D 5/04* (2013.01); *B05D 2401/20* (2013.01); *B05D 2503/00* (2013.01)

(58) Field of Classification Search
None
See application file for complete search history.

(56) References Cited

U.S. PATENT DOCUMENTS 4,731,290 A 3/1988 Chang
4,851,460 A 7/1989 Stranghoener et al.
(Continued)

FOREIGN PATENT DOCUMENTS

WO 2006084260 A1 8/2006
WO 2006118974 A1 11/2006
(Continued)

OTHER PUBLICATIONS

DPMA, German Office Action issued in Application No. 10 2014 014 692.8, dated Feb. 2, 2016.

*Primary Examiner* — Michael P Rodriguez
(74) *Attorney, Agent, or Firm* — Lorenz & Kopf LLP

(57) ABSTRACT

A process for the production of a multi-layer coating includes applying a coating layer from an aqueous pigmented coating composition A onto a substrate provided with an EDC primer and applying a base coat layer from an aqueous coating composition B overlying the coating layer. A clear coat layer is applied onto the base coat layer and the three coating layers are jointly bake-cured. The coating compositions A and B are different from each other and coating composition A comprises (i) binder solids, (ii) free polyisocyanate, (iii) a pigment content free of special effect pigments and comprising carbon black pigment and/or titanium dioxide pigment, and (iv) talcum filler.

19 Claims, 1 Drawing Sheet

| | | | | | | | | 0% wt.% talc | | 2% wt.% talc | | 5% wt.% talc | |
|---|---|---|---|---|---|---|---|---|---|---|---|---|---|
| | U2786XP | Latex1 | PU1 | PU2 | PU3 | PE1 | PE2 | MF900 | original | Rep | original | Rep | original | Rep |
| 1 | 20 | 15 | 30 | 25 | 10 | 0 | 0 | 0 | 1 | 1.5 | 1 | 1.5 | 1 | 2.5 |
| 2 | 20 | 0 | 30 | 40 | 10 | 0 | 0 | 0 | 1 | 2 | 2 | 1.5 | 1 | 2 |
| 3 | 14 | 10.5 | 21 | 17.5 | 7 | 0 | 21 | 9 | 1 | 2.5 | 1 | 1.5 | x | x |
| 4 | 14 | 10.5 | 21 | 17.5 | 7 | 21 | 0 | 9 | 1 | 2 | 1 | 1.5 | x | x |

(51) Int. Cl.
    *B05D 1/38*     (2006.01)
    *B05D 3/02*     (2006.01)
    *B05D 5/04*     (2006.01)

(56) References Cited

U.S. PATENT DOCUMENTS

| | | |
|---|---|---|
| 5,342,882 A | 8/1994 | Gobel et al. |
| 5,976,343 A * | 11/1999 | Schlaak ............ B05D 7/577 205/149 |
| 2006/0286303 A1* | 12/2006 | Avgenaki ............ B05D 5/068 427/372.2 |
| 2010/0048811 A1 | 2/2010 | Chilla et al. |
| 2010/0130680 A1* | 5/2010 | Renkes ............ C08F 2/001 524/811 |

FOREIGN PATENT DOCUMENTS

| | | |
|---|---|---|
| WO | 2007001831 A1 | 1/2007 |
| WO | 2007041228 A1 | 4/2007 |
| WO | 2008124136 A1 | 10/2008 |
| WO | 2008124137 A1 | 10/2008 |
| WO | 2008124141 A1 | 10/2008 |

\* cited by examiner

|   | U2786XP | Latex1 | PU1 | PU2 | PU3 | PE1 | PE2 | MF900 | 0% wt.% talc | | 2% wt.% talc | | 5% wt.% talc | |
|---|---------|--------|-----|-----|-----|-----|-----|-------|--------------|---|--------------|---|--------------|---|
|   |         |        |     |     |     |     |     |       | original | Rep | original | Rep | original | Rep |
| 1 | 20 | 15   | 30 | 25   | 10 | 0  | 0  | 0 | 1 | 1.5 | 1 | 1.5 | 1 | 2.5 |
| 2 | 20 | 0    | 30 | 40   | 10 | 0  | 0  | 0 | 1 | 2   | 2 | 1.5 | 1 | 2   |
| 3 | 14 | 10.5 | 21 | 17.5 | 7  | 0  | 21 | 9 | 1 | 2.5 | 1 | 1.5 | x | x   |
| 4 | 14 | 10.5 | 21 | 17.5 | 7  | 21 | 0  | 9 | 1 | 2   | 1 | 1.5 | x | x   |

PROCESS FOR THE PRODUCTION OF A MULTI-LAYER COATING

CROSS-REFERENCE TO RELATED APPLICATION

This application claims priority to European Patent Application No. 13187131.1, filed Oct. 2, 2013, and to European Patent Application No. 13187136.0, filed Oct. 2, 2013, and to European Patent Application No. 13187134.5, filed Oct. 2, 2013, which are all incorporated herein by reference in their entirety.

TECHNICAL FIELD

The technical field relates to processes for the production of a multi-layer coating.

BACKGROUND

Multi-layer coating processes comprising a wet-on-wet-on-wet application and joint curing of three different coating layers onto electrocoated substrates have been disclosed, for example, in WO2007/001831 A1 and WO2007/041228 A1.

SUMMARY

A first embodiment is directed to a process for the production of a multi-layer coating comprising the successive steps:
applying an about 10 to about 30 μm thick coating layer from an aqueous pigmented coating composition A onto a substrate provided with an EDC (electrodeposition coating) primer,
applying an about 10 to about 25 μm thick base coat layer from an aqueous coating composition B onto the previously applied coating layer,
applying an about 30 to about 50 μm thick clear coat layer onto the base coat layer,
joint bake-curing the three coating layers,
wherein coating compositions A and B are different from each other,
wherein coating composition A comprises (i) binder solids consisting of about 10 to about 50 wt. % (weight-%) of aqueous (meth)acryl copolymer latex binder, about 50 to about 90 wt. % of aqueous polyurethane binder and 0 to about 30 wt. % of one or more other binders, (ii) free polyisocyanate, (iii) a pigment content free of special effect pigments and comprising carbon black pigment and/or titanium dioxide pigment, and (iv) talcum filler, and
wherein the wt. % are calculated on a solids basis and total 100 wt. %.

A second embodiment is directed to a process for the production of a multi-layer coating comprising the successive steps:
applying an about 10 to about 30 μm thick coating layer from an aqueous pigmented coating composition A onto a substrate provided with an EDC (electrodeposition coating) primer,
applying an about 10 to about 25 μm thick base coat layer from an aqueous coating composition B onto the previously applied coating layer,
applying an about 30 to about 50 μm thick clear coat layer onto the base coat layer,
jointly bake-curing the three coating layers,
wherein coating compositions A and B are different from each other,
wherein coating composition A comprises (i) binder solids, (ii) free polyisocyanate, (iii) a pigment content free of special effect pigments and comprising carbon black pigment and/or titanium dioxide pigment, and (iv) talcum filler,
wherein the free polyisocyanate is a combination of one or more hydrophilic polyisocyanates and one or more conventional polyisocyanates.

A third embodiment is directed to a process for the production of a multi-layer coating comprising the successive steps:
applying an about 10 to about 30 μm thick coating layer from an aqueous pigmented coating composition A onto a substrate provided with an EDC (electrodeposition coating) primer,
applying an about 10 to about 25 μm thick base coat layer from an aqueous coating composition B onto the previously applied coating layer,
applying an about 30 to about 50 μm thick clear coat layer onto the base coat layer,
jointly bake-curing the three coating layers,
wherein coating compositions A and B are different from each other,
wherein coating composition A comprises (i) binder solids, (ii) free polyisocyanate, (iii) a pigment content free of special effect pigments and comprising carbon black pigment and/or titanium dioxide pigment, and (iv) talcum filler,
wherein coating composition B comprises a resin solids composition of about 10 to about 50 wt. % (weight-%) of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, wherein the wt. % are calculated on a solids basis and total 100 wt. %.

BRIEF DESCRIPTION OF THE DRAWINGS

The present invention will hereinafter be described in conjunction with the FIGURE, which illustrates test results of various coatings subjected to stone-chip resistance tests according to DIN EN ISO 20567-1.

DETAILED DESCRIPTION

Unless otherwise explicitly mentioned to the contrary the following applies to all embodiments described herein.

In the description and the claims film thicknesses (layer thicknesses, coating thicknesses) for coating layers are indicated. They refer in each case to dry film thicknesses.

In the description and the claims a distinction is made between "solids", "resin solids", "binder solids" and "crosslinker solids" of coating compositions. The term "solids" means non-volatile components. For example, the solids of a color- and/or effect-imparting waterborne base coat composition are formed by its resin solids plus pigments plus optionally present fillers (extender pigments) plus optionally present non-volatile additives. Resin solids means binder solids plus, if present, crosslinker solids. Binder solids means the solids contribution of one or more binders. Crosslinker solids means the solids contribution of one or more crosslinkers. The solids of a volatile matter-comprising coating composition or a coating intermediate like, for example, a binder solution or a binder dispersion, can be determined in accordance with DIN EN ISO 3251 (60 minutes@150° C.).

The term or prefix, "(meth)acryl", is used herein; it shall mean acryl and/or methacryl.

The term "free polyisocyanate" used in the description and the claims means polyisocyanate with free NCO groups as opposed to polyisocyanate having blocked NCO groups.

The term "pigment content" used in the description and the claims means the sum of all pigments comprised in a coating composition without fillers.

In the description and the claims a distinction is made between pigments and fillers. The term "pigments" is used here as in DIN 55944 and covers, in addition to special effect pigments, inorganic white, colored and black pigments and organic colored and black pigments. At the same time, therefore, DIN 55944 distinguishes between pigments and fillers.

In the processes contemplated herein, conventional substrates provided with an EDC primer are coated. In particular, the substrates are automotive bodies or automotive body parts provided with an EDC primer, in particular, a CED (cathodic electrodeposition) coating. The production of substrates provided with an EDC primer is known to the person skilled in the art.

The substrates having an EDC primer are provided, first of all, with a coating layer of an aqueous pigmented coating composition A in a film thickness in the range from about 10 to about 30 μm, preferably from about 10 to about 20 μm.

The about 10 to about 30 μm thick coating layer applied from aqueous pigmented coating composition A allows virtually no access of UV light to its subjacent EDC primer layer, or, to be more precise, the about 10 to about 30 μm layer thickness provides for a UV transmission through the coating layer of, for example, less than about 0.1% in the wavelength range of from about 280 to about 380 nm, less than about 0.5% in the wavelength range of from about 380 to about 400 nm and less than about 1% in the wavelength range of from about 400 to about 450 nm.

After the application of the about 10 to about 30 μm thick coating layer from the aqueous pigmented coating composition A, a base coat layer of an aqueous coating composition B is applied in a film thickness of about 10 to about 25 μm.

The sum of the coating thickness for the two-layer coating produced from the coating compositions A and B is, for example, about 20 to about 35 μm. The film thickness of each individual coating layer and as a result the total film thickness is dependent inter alia on color shade; car manufacturers' requirements for the respective film thicknesses are expressed in the so-called process film thickness (average film thickness which is desired over the entire body in the automotive original coating process), which is directed towards the film thickness for each color shade required to achieve the desired color shade on the substrate and to achieve technological properties (e.g., stone chip resistance, prevention of UV access to the subjacent EDC primer layer) and towards an economic application of the relevant coating composition, i.e., in as thin a film as possible. The ranges of about 10 to about 30 μm film thickness for the coating layer of coating composition A and of about 10 to about 25 μm film thickness for the coating layer of coating composition B meet the requirements for coating the relevant substrates, for example, automotive bodies. In particular, this means that a specific value within the stated ranges represents the process film thickness for the respective coating layer.

The aqueous pigmented coating composition A is referred to in the description and the claims also as coating composition A for short.

Coating composition A is an aqueous pigmented coating composition having a solids content of, for example, about 25 to about 45 wt. % (weight %). The solids content is formed from any non-volatile constituents including the binder solids, the free polyisocyanate solids and any further components making a solids contribution including the pigments, the talcum filler and, if present, other fillers and non-volatile additives.

In addition to water, the resin solids consisting of the binder solids and the free polyisocyanate solids, the pigment content, the talcum filler, optionally present other fillers and optionally present organic solvents, coating composition A may also comprise conventional coating additives.

In the following, the first embodiment is described.

The binder solids of coating composition A consist of about 10 to about 50 wt. % of aqueous (meth)acryl copolymer latex binder, about 50 to about 90 wt. % of aqueous polyurethane binder and 0 to about 30 wt. % of one or more other binders, wherein the wt. % are calculated on a solids basis and total 100 wt. %.

Aqueous (meth)acryl copolymer latex binders and their production are well known to the skilled person. Aqueous (meth)acryl copolymer latex binders can typically be made by free-radical emulsion copolymerization of olefinically unsaturated free-radically copolymerizable comonomers. For example, WO2006/118974 A1, WO2008/124136 A1, WO2008/124137 A1 and WO2008/124141 A1 disclose aqueous (meth)acryl copolymer latex binders and their use as binders in waterborne base coat compositions as are conventional in the production of base coat/clear coat two-layer coatings of car bodies and body parts. The aqueous (meth)acryl copolymer latex binders disclosed in WO2006/118974 A1, WO2008/124136 A1, WO2008/124137 A1 and WO2008/124141 A1 are examples of aqueous (meth)acryl copolymer latex binders which can be used in coating composition A.

Aqueous polyurethane binders and their production are well known to the skilled person. Typical and useful examples of aqueous polurethane binders comprise aqueous polyurethane binder dispersions which can typically be made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender like, for example, a polyamine, a hydrazine derivative or water. In particular, such aqueous polyurethane binder dispersions as have been used as binders in waterborne base coat compositions as are conventional in the production of base coat/clear coat two-layer coatings of car bodies and body parts can be used in coating composition A; examples of aqueous polyurethane binder dispersions which can be used in coating composition A can be found in U.S. Pat. No. 4,851,460, U.S. Pat. No. 5,342,882 and US 2010/0048811 A1.

The term "polyurethane binder" used in the description and the claims does not rule out that the polyurethane binder in question may also comprise groups other than urethane groups in the polymer backbone, such as, in particular, ester groups and/or urea groups. Instead, the term "polyurethane binder" includes polyurethane binders which comprise polyester polyol building blocks and/or urea groups, wherein the latter may, for example, be formed by the reaction of isocyanate groups with water and/or polyamine.

As already mentioned above, coating composition A may comprise one or more binders other than aqueous (meth)acryl copolymer latex binders and aqueous polyurethane binders. Examples include polyester binders, hybrid binders derived from (meth)acryl copolymers, polyurethanes and/or polyesters, and, in particular, aminoplast resins such as melamine formaldehyde condensate resins.

Melamine formaldehyde condensate resins (melamine resins) are well known to the skilled person. They may be partially or fully etherified with one or more alcohols like methanol or butanol. An example is hexamethoxymethyl melamine.

Coating composition A comprises free polyisocyanate, i.e., one or more free polyisocyanates, such as di- and/or polyisocyanates with aliphatically, cycloaliphatically, araliphatically and/or, less preferably, aromatically attached isocyanate groups.

The free isocyanate group content of the polyisocyanates is in general in a range from about 2 to about 25 wt. %, for example, from about 5 to about 25 wt. % (calculated as NCO).

Examples of diisocyanates are hexane diisocyanate, tetramethylxylylene diisocyanate, isophorone diisocyanate, dicyclohexylmethane diisocyanate, and cyclohexane diisocyanate.

Examples of polyisocyanates are those which comprise heteroatoms in the residue linking the isocyanate groups. Examples of these are polyisocyanates which comprise carbodiimide groups, allophanate groups, isocyanurate groups, uretidione groups, urethane groups, acylated urea groups or biuret groups. The polyisocyanates preferably have an isocyanate functionality higher than 2, such as, for example, polyisocyanates of the uretidione or isocyanurate type produced by di- or trimerization of the above-mentioned diisocyanates. Further examples are polyisocyanates produced by reaction of the above-mentioned diisocyanates with water and comprising biuret groups or polyisocyanates produced by reaction with polyols and comprising urethane groups.

Of particular suitability are, for example, "coating polyisocyanates" based on hexane diisocyanate, isophorone diisocyanate or dicyclohexylmethane diisocyanate. "Coating polyisocyanates" based on these diisocyanates means the per se known biuret, urethane, uretidione and/or isocyanurate group-comprising derivatives of these diisocyanates.

Also suitable are hydrophilic polyisocyanates (hydrophilically-modified polyisocyanates). As opposed to the conventional free polyisocyanates mentioned in the preceding paragraphs, the hydrophilic polyisocyanates comprise a sufficient number of ionic groups and/or terminal or lateral polyether chains which stabilize them in the aqueous phase. The conventional free polyisocyanates do not comprise ionic groups and/or terminal or lateral polyether chains. Hydrophilic polyisocyanates are sold as commercial products, for example, by Bayer under the name Bayhydur®.

In the following, the second and third embodiments are described.

Coating composition A comprises an ionically and/or non-ionically stabilized binder system. This is preferably anionically and/or non-ionically stabilized. Anionic stabilization is preferably achieved by at least partially neutralized carboxyl groups in the binder, while non-ionic stabilization is preferably achieved by lateral or terminal polyethylene oxide units in the binder.

Coating composition A comprises one or more conventional film-forming binders. Examples of film-forming binders, which may be used, are conventional polyester, polyurethane, (meth)acrylic copolymer and hybrid resins derived from these classes of resin.

In an embodiment, coating composition A comprises a binder solids consisting of about 10 to about 50 wt. % of aqueous (meth)acryl copolymer latex binder, about 50 to about 90 wt. % of aqueous polyurethane binder and 0 to about 30 wt. % of one or more other binders, wherein the wt. % are calculated on a solids basis and total 100 wt. %.

Aqueous (meth)acryl copolymer latex binders and their production are well known to the skilled person. Aqueous (meth)acryl copolymer latex binders can typically be made by free-radical emulsion copolymerization of olefinically unsaturated free-radically copolymerizable comonomers. For example, WO2006/118974 A1, WO2008/124136 A1, WO2008/124137 A1 and WO2008/124141 A1 disclose aqueous (meth)acryl copolymer latex binders and their use as binders in waterborne base coat compositions as are conventional in the production of base coat/clear coat two-layer coatings of car bodies and body parts. The aqueous (meth)acryl copolymer latex binders disclosed in WO2006/118974 A1, WO2008/124136 A1, WO2008/124137 A1 and WO2008/124141 A1 are examples of aqueous (meth)acryl copolymer latex binders which can be used in coating composition A in its embodiment mentioned in the preceding paragraph.

Aqueous polyurethane binders and their production are well known to the skilled person. Typical and useful examples of aqueous polurethane binders comprise aqueous polyurethane binder dispersions which can typically be made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender like, for example, a polyamine, a hydrazine derivative or water. In particular, such aqueous polyurethane binder dispersions as have been used as binders in waterborne base coat compositions as are conventional in the production of base coat/clear coat two-layer coatings of car bodies and body parts can be used in coating composition A in its embodiment mentioned above; examples of aqueous polyurethane binder dispersions which can be used in coating composition A in its embodiment mentioned above can be found in U.S. Pat. No. 4,851,460, U.S. Pat. No. 5,342,882 and US 2010/0048811 A1.

The term "polyurethane binder" used in the description and the claims does not rule out that the polyurethane binder in question may also comprise groups other than urethane groups in the polymer backbone, such as, in particular, ester groups and/or urea groups. Instead, the term "polyurethane binder" includes polyurethane binders which comprise polyester polyol building blocks and/or urea groups, wherein the latter may, for example, be formed by the reaction of isocyanate groups with water and/or polyamine.

As already mentioned above, coating composition A in its embodiment mentioned above may comprise one or more binders other than aqueous (meth)acryl copolymer latex binder and aqueous polyurethane binder. Examples include polyester binders, hybrid binders derived from (meth)acryl copolymers, polyurethanes and/or polyesters, and, in particular, aminoplast resins such as melamine formaldehyde condensate resins.

Melamine formaldehyde condensate resins (melamine resins) are well known to the skilled person. They may be partially or fully etherified with one or more alcohols like methanol or butanol. An example is hexamethoxymethyl melamine.

In the following, exemplary features of the second embodiment are described.

Coating composition A comprises a free polyisocyanate combination or mixture of one or more hydrophilic polyisocyanates and one or more conventional polyisocyanates.

In the description and the claims a distinction is made between conventional and hydrophilic polyisocyanates (hydrophilically modified polyisocyanates). As opposed to conventional free polyisocyanates, hydrophilic free polyisocyanates comprise a sufficient number of ionic groups and/or terminal or lateral polyether chains which stabilize them in the aqueous phase. Hydrophilic free polyisocyanates are sold as commercial products, for example, by Bayer under the name Bayhydur®.

The conventional free polyisocyanates do not comprise ionic groups and/or terminal or lateral polyether chains. Examples of conventional free polyisocyanates comprise di- and/or polyisocyanates with aliphatically, cycloaliphatically, araliphatically and/or, less preferably, aromatically attached isocyanate groups and without ionic groups and/or terminal or lateral polyether chains.

Examples of conventional free diisocyanates are hexane diisocyanate, tetramethylxylylene diisocyanate, isophorone diisocyanate, dicyclohexylmethane diisocyanate, and cyclohexane diisocyanate. Examples of conventional free polyisocyanates are those which comprise heteroatoms in the residue linking the isocyanate groups. Examples of these are polyisocyanates which comprise carbodiimide groups, allophanate groups, isocyanurate groups, uretidione groups, urethane groups, acylated urea groups or biuret groups. The polyisocyanates preferably have an isocyanate functionality higher than 2, such as, for example, polyisocyanates of the uretidione or isocyanurate type produced by di- or trimerization of the above-mentioned diisocyanates. Further examples are polyisocyanates produced by reaction of the above-mentioned diisocyanates with water and comprising biuret groups or polyisocyanates produced by reaction with polyols and comprising urethane groups. Of particular suitability are, for example, "coating polyisocyanates" based on hexane diisocyanate, isophorone diisocyanate or dicyclohexylmethane diisocyanate. "Coating polyisocyanates" based on these diisocyanates means the per se known biuret, urethane, uretidione and/or isocyanurate group-comprising derivatives of these diisocyanates.

The free isocyanate group content of the polyisocyanates is in general in a range from about 2 to about 25 wt. %, for example, from about 5 to about 25 wt. % (calculated as NCO).

In the following, exemplary features of the third embodiment are described.

Coating composition A comprises free polyisocyanate, i.e. one or more free polyisocyanates, such as di- and/or polyisocyanates with aliphatically, cycloaliphatically, araliphatically and/or, less preferably, aromatically attached isocyanate groups.

The free isocyanate group content of the polyisocyanates is in general in a range from about 2 to about 25 wt. %, for example, from about 5 to about 25 wt. % (calculated as NCO).

Examples of diisocyanates are hexane diisocyanate, tetramethylxylylene diisocyanate, isophorone diisocyanate, dicyclohexylmethane diisocyanate, and cyclohexane diisocyanate.

Examples of polyisocyanates are those which comprise heteroatoms in the residue linking the isocyanate groups. Examples of these are polyisocyanates which comprise carbodiimide groups, allophanate groups, isocyanurate groups, uretidione groups, urethane groups, acylated urea groups or biuret groups. The polyisocyanates preferably have an isocyanate functionality higher than 2, such as, for example, polyisocyanates of the uretidione or isocyanurate type produced by di- or trimerization of the above-mentioned diisocyanates. Further examples are polyisocyanates produced by reaction of the above-mentioned diisocyanates with water and comprising biuret groups or polyisocyanates produced by reaction with polyols and comprising urethane groups.

Of particular suitability are, for example, "coating polyisocyanates" based on hexane diisocyanate, isophorone diisocyanate or dicyclohexylmethane diisocyanate. "Coating polyisocyanates" based on these diisocyanates means the per se known biuret, urethane, uretidione and/or isocyanurate group-comprising derivatives of these diisocyanates.

Also suitable are hydrophilic polyisocyanates (hydrophilically-modified polyisocyanates). As opposed to the conventional free polyisocyanates mentioned in the preceding paragraphs, the hydrophilic polyisocyanates comprise a sufficient number of ionic groups and/or terminal or lateral polyether chains which stabilize them in the aqueous phase. The conventional free polyisocyanates do not comprise ionic groups and/or terminal or lateral polyether chains. Hydrophilic polyisocyanates are sold as commercial products, for example, by Bayer under the name Bayhydur®.

Unless otherwise explicitly mentioned to the contrary the following applies to all embodiments contemplated herein.

Coating composition A is a two-component coating composition. Its two components are stored separately from one another before being mixed to form coating composition A. One of the two components comprises the free polyisocyanate. The component comprising the free polyisocyanate may be the free polyisocyanate as such or, in an embodiment, it may be a preparation comprising inert organic solvent (organic solvent without active hydrogen). In other words, the free polyisocyanate may as such be introduced into coating composition A or, in said embodiment, as a preparation comprising inert organic solvent. Examples of such inert organic solvent without active hydrogen include ethers, such as, for example, diethylene glycol diethyl ether, dipropylene glycol dimethyl ether; glycol ether esters, such as, ethylene glycol monobutyl ether acetate, diethylene glycol monobutyl ether acetate, methoxypropyl acetate; γ-butyrolactone; and N-alkylpyrrolidones, such as, N-methylpyrrolidone and N-ethylpyrrolidone.

Coating composition A is prepared just prior to its application by mixing said two components, one of which comprises the free polyisocyanate.

In an embodiment, the free polyisocyanate forms a component of a preparation, in particular a solution, of a mixture of one or more hydrophilic polyisocyanates and one or more conventional polyisocyanates in inert organic solvent, in particular γ-butyrolactone; the solids weight ratio between the hydrophilic polyisocyanate and the conventional polyisocyanate may be, for example, about 80:20 to about 50:50. The preparation or solution may comprise, for example, about 60 to about 90 wt. % solids of a mixture of one or more hydrophilic polyisocyanates and one or more conventional polyisocyanates in about 10 to about 40 wt. % of inert organic solvent, in particular γ-butyrolactone, wherein the wt. % total 100 wt. %. A typical composition of a preferred free polyisocyanate preparation is about 10 to about 40 wt. % γ-butyrolactone, about 20 to about 40 wt. % Desmodur® N 3600 (conventional polyisocyanate, hexane diisocyanate trimer) and about 20 to about 70 wt. % Bayhydur® 3100 (hydrophilic polyisocyanate on hexane diisocyanate basis), wherein the wt. % total 100 wt. %.

In accordance with the embodiment mentioned in the preceding paragraph, coating composition A may comprise a mixture of one or more hydrophilic polyisocyanates and one or more conventional polyisocyanates as the free polyisocyanate, and inert organic solvent; the inert organic solvent may, in particular, comprise or even be γ-butyrolactone. For example, coating composition A may comprise hydrophilic polyisocyanate and conventional polyisocyanate in a about 80:20 to about 50:50 solids weight ratio, and inert organic solvent; the inert organic solvent may, in particular, comprise or even be γ-butyrolactone.

The binder solids:free polyisocyanate solids weight ratio of coating composition A is, for example, about 2.5:1 to about 3.5:1. The free polyisocyanate may act as a crosslinker for one or more components of the binder solids of coating composition A, if one or more of these components carry functional groups reactive towards free NCO groups such as, for example, hydroxyl groups.

Coating composition A comprises a pigment content free of special effect pigments and comprising carbon black pigment and/or titanium dioxide pigment. The pigment content does not comprise any special effect pigment; however, in addition to the carbon black pigment and/or the titanium dioxide pigment, it may comprise other pigments selected from white, colored and black pigments. The pigment/resin solids ratio by weight is, for example, from about 0.1:1 to about 0.8:1.

In the description and the claims a distinction is made between special-effect pigments and other pigments. Special-effect pigments are pigments imparting to a coating a color and/or lightness flop dependent on the angle of observation, such as non-leafing metal pigments, e.g., of aluminum, copper or other metals, interference pigments such as, for example, metal oxide-coated metal pigments, e.g., iron oxide-coated aluminum, coated mica such as, for example, titanium dioxide-coated mica, graphite effect-imparting pigments, iron oxide in flake form, liquid crystal pigments, coated aluminum oxide pigments, and coated silicon dioxide pigments. Pigments other than special-effect pigments comprise carbon black pigments and titanium dioxide pigments as well as other white, colored and black pigments. Examples of white, colored and black pigments other than carbon black pigments and titanium dioxide pigments comprise conventional inorganic or organic pigments known to the person skilled in the art, such as, for example, iron oxide pigments, azo pigments, phthalocyanine pigments, quinacridone pigments, pyrrolopyrrole pigments, and perylene pigments.

The white, colored and black pigments are generally ground. The grinding may be performed in conventional assemblies known to the person skilled in the art. Generally, the grinding takes place in a proportion of the binder or in specific grinding resins (paste resins). The formulation is then completed with the remaining proportion of the binder or of the paste resin.

Coating composition A comprises talcum filler in a proportion of, for example, about 2 to about 3.5 wt. % based on the resin solids. It may also comprise one or more other fillers, for example, in a total proportion (talcum plus other fillers) of up to about 25 wt. % based on the resin solids. The fillers do not constitute part of the pigment content of coating composition A. Examples of other fillers are barium sulfate, kaolin, silicon dioxide, layered silicates and any mixtures thereof.

The water content of coating composition A is, for example, about 50 to about 70 wt. %.

Coating composition A may comprise conventional solvents, for example, in a proportion of 0 to about 20 wt. %, such as about 5 to about 15 wt. %. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether; glycols, for example, ethylene glycol and/or propylene glycol, and the di- or trimers thereof; N-alkylpyrrolidones, such as, for example, N-methylpyrrolidone and N-ethylpyrrolidone; ketones, such as, methyl ethyl ketone, acetone, cyclohexanone; γ-butyrolactone; aromatic or aliphatic hydrocarbons, for example, toluene, xylene or linear or branched aliphatic C6-C12 hydrocarbons.

Coating composition A may comprise conventional additives in conventional quantities, for example, of about 0.1 to about 5 wt. % active substance. Examples are antifoaming agents, wetting agents, adhesion promoters, catalysts, leveling agents, anticratering agents, thickeners and light stabilizers, for example, UV absorbers and/or HALS-based compounds (HALS, hindered amine light stabilizers).

Aqueous coating composition B is a waterborne base coat composition, such as is conventional in the production of base coat/clear coat two-layer coatings of car bodies and body parts. The aqueous coating composition B is referred to in the description and the claims also as coating composition B or as waterborne base coat B for short.

The solids of coating composition B comprise any non-volatile constituents including the resin solids and any further components making a solids contribution including pigments and, if present, fillers and non-volatile additives.

Waterborne base coat B has a solids content of, for example, about 10 to about 40 wt. %, for example from about 15 to about 30 wt. %. The ratio by weight of pigment content to resin solids is, for example, about 0.02:1 to about 1:1.

In the following, exemplary features of the first and second embodiments are described.

In addition to water, a resin solids content comprising binder solids and optionally present crosslinker solids, pigments, optionally present fillers and optionally present organic solvents, waterborne base coat B may also comprise conventional coating additives.

Waterborne base coat B comprises an ionically and/or non-ionically stabilized binder system. This is, for example, anionically and/or non-ionically stabilized. Anionic stabilization is preferably achieved by at least partially neutralized carboxyl groups in the binder, while non-ionic stabilization is preferably achieved by lateral or terminal polyethylene oxide units in the binder. Waterborne base coat B may be physically drying or crosslinkable by formation of covalent bonds.

Waterborne base coat B comprises one or more conventional film-forming binders. It may optionally also comprise one or more crosslinkers. Examples of film-forming binders, which may be used, are conventional polyester, polyurethane, (meth)acrylic copolymer and hybrid resins derived from these classes of resin.

In a particular embodiment, waterborne base coat B comprises a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, wherein the wt. % are calculated on a solids basis and total 100 wt. %.

Regarding the aqueous (meth)acryl copolymer latex binder, the aqueous polyurethane binder and the melamine formaldehyde condensate resin it is referred to the disclosure made above in connection with coating composition A. The aqueous (meth)acryl copolymer latex binders disclosed in WO2006/118974 A1, WO2008/124136 A1, WO2008/124137 A1 and WO2008/124141 A1 are examples of aqueous (meth)acryl copolymer latex binders which can be used in coating composition B in its particular embodiment. Examples of aqueous polyurethane binder dispersions which can be used in coating composition B in its particular embodiment can be found in U.S. Pat. No. 4,851,460, U.S. Pat. No. 5,342,882 and US 2010/0048811 A1.

As already mentioned, waterborne base coat B in its particular embodiment may comprise one or more binders other than aqueous (meth)acryl copolymer latex binder, aqueous polyurethane binder and melamine resin. Examples include polyester binders and hybrid binders derived from (meth)acryl copolymers, polyurethanes and/or polyesters.

In the following, exemplary features of the third embodiment are described.

Waterborne base coat B comprises a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, wherein the wt. % are calculated on a solids basis and total 100 wt. %.

Regarding the aqueous (meth)acryl copolymer latex binder, the aqueous polyurethane binder and the melamine formaldehyde condensate resin it is referred to the disclosure made above in connection with coating composition A. The aqueous (meth)acryl copolymer latex binders disclosed in WO2006/118974 A1, WO2008/124136 A1, WO2008/124137 A1 and WO2008/124141 A1 are examples of aqueous (meth)acryl copolymer latex binders which can be used in coating composition B. Examples of aqueous polyurethane binder dispersions which can be used in coating composition B can be found in U.S. Pat. No. 4,851,460, U.S. Pat. No. 5,342,882 and US 2010/0048811 A1.

As already mentioned, waterborne base coat B may comprise one or more binders other than aqueous (meth)acryl copolymer latex binder, aqueous polyurethane binder and melamine resin. Examples include polyester binders and hybrid binders derived from (meth)acryl copolymers, polyurethanes and/or polyesters.

In addition to water, the resin solids, pigments, optionally present fillers and optionally present organic solvents, waterborne base coat B may also comprise conventional coating additives.

Unless otherwise explicitly mentioned to the contrary the following applies to all embodiments contemplated herein.

Waterborne base coat B comprises conventional pigments, for example, special-effect pigments and/or pigments selected from among white, colored and black pigments.

Examples of special-effect pigments are the same like those mentioned above.

Examples of white, colored and black pigments are the conventional inorganic or organic pigments known to the person skilled in the art, such as, for example, titanium dioxide pigments, iron oxide pigments, carbon black pigments, azo pigments, phthalocyanine pigments, quinacridone pigments, pyrrolopyrrole pigments, and perylene pigments.

The special-effect pigments are generally initially introduced in the form of a conventional commercial aqueous or non-aqueous paste, optionally, combined with preferably water-dilutable organic solvents and additives and then mixed with aqueous binder. Pulverulent special-effect pigments may first be processed with preferably water-dilutable organic solvents and, optionally, additives to yield a paste.

White, colored and black pigments and/or fillers may, for example, be ground in a proportion of the aqueous binder. Grinding may preferably also take place in a special aqueous paste resin. Grinding may be performed in conventional assemblies known to the person skilled in the art. The formulation is then completed with the remaining proportion of the aqueous binder or of the aqueous paste resin.

Waterborne base coat B may also comprise one or more fillers, for example, in proportions of 0 to about 30 wt. % relative to the resin solids content. The fillers do not constitute part of the pigment content of the waterborne base coat B. Examples are barium sulfate, kaolin, talcum, silicon dioxide, layered silicates and any mixtures thereof.

The water content of waterborne base coat B is, for example, about 60 to about 90 wt. %.

Waterborne base coat B may comprise conventional organic solvents, for example, in a proportion of less than about 20 wt. %, such as, less than about 15 wt. %. These are conventional coating solvents, which may originate, for example, from production of the binders or are added separately. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether; glycols, for example, ethylene glycol and/or propylene glycol, and the di- or trimers thereof; N-alkylpyrrolidones, such as, for example, N-methylpyrrolidone and N-ethylpyrrolidone; ketones, such as, methyl ethyl ketone, acetone, cyclohexanone; aromatic or aliphatic hydrocarbons, for example, toluene, xylene or linear or branched aliphatic C6-C12 hydrocarbons.

Waterborne base coat B may comprise conventional additives in conventional quantities, for example, of about 0.1 to about 5 wt. % active substance. Examples are antifoaming agents, wetting agents, adhesion promoters, catalysts, leveling agents, anticratering agents, thickeners and light stabilizers, for example, UV absorbers and/or HALS-based compounds (HALS, hindered amine light stabilizers).

In process step 1) of the process contemplated herein, the EDC-primed substrate is provided with an about 10 to about 30 µm thick coating layer of coating composition A, in particular by spray-coating. The spray-coating is preferably performed using electrostatically-assisted high-speed rotary atomization.

Then the so-applied coating layer is flashed off without a need for forced drying, i.e. the flash-off step is typically performed within about 30 seconds to about 5 minutes at an air temperature of about 20 to about 30° C.

Waterborne base coat B is then spray applied during process step 2) of the process contemplated herein in a dry film thickness of about 10 to about 25 µm. The spray-coating may be performed using electrostatically-assisted high-speed rotary atomization, pneumatic spray application or a combination of electrostatically-assisted high-speed rotary atomization and pneumatic spray application.

Then the so-applied base coat layer B is flashed off, for example, for about 30 seconds to about 5 minutes at an air temperature of about 20 to about 30° C. and then forced dried, for example, for about 5 minutes at an air temperature of about 50 to about 80° C.

Thereafter, the clear coat is applied, in particular by spraying, during process step 3) of the process contemplated herein in a dry film thickness of, for example, about 30 to about 50 µm.

All known liquid clear coats are in principle suitable as the clear coat. Usable clear coats are both solvent-comprising one-component (1 pack) or two-component (2 pack) clear coats, water-dilutable 1 pack or 2 pack clear coats.

After an optional clear coat flash-off phase, the two-layer coating applied from the coating compositions A and B and the clear coat layer are jointly cured by baking, for example, for about 15 to about 30 minutes at about 130 to about 160° C. object temperature during process step 4) of the process contemplated herein.

The multi-layer coating produced by the process herein is distinguished by an excellent appearance. There is no need for a forced drying of the coating layer applied from coating composition A. Formation of bubbles and pinholes within the bake-cured multi-layer coating can be minimized or even prevented.

In the following clauses, exemplary features of the first embodiment are described.

1. A process for the production of a multi-layer coating comprising the successive steps:
applying an about 10 to about 30 µm thick coating layer from an aqueous pigmented coating composition A onto a substrate provided with an EDC primer,
applying an about 10 to about 25 µm thick base coat layer from an aqueous coating composition B onto the previously applied coating layer,
applying an about 30 to about 50 µm thick clear coat layer onto the base coat layer,
jointly bake-curing the three coating layers,
wherein coating compositions A and B are different from each other,
wherein coating composition A comprises (i) binder solids consisting of about 10 to about 50 wt. % of aqueous (meth)acryl copolymer latex binder, about 50 to about 90 wt. % of aqueous polyurethane binder and 0 to about 30 wt. % of one or more other binders, (ii) free polyisocyanate, (iii) a pigment content free of special effect pigments and comprising carbon black pigment and/or titanium dioxide pigment, and (iv) talcum filler, and wherein the wt. % are calculated on a solids basis and total 100 wt. %.

2. The process of clause 1, wherein the substrate is an automotive body or an automotive body part.

3. The process of clause 1 or 2, wherein the sum of the coating thickness for the two-layer coating produced from the coating compositions A and B is about 20 to about 35 nm.

4. The process of clause 1, 2 or 3, wherein the aqueous (meth)acryl copolymer latex binder of coating composition A is made by free-radical emulsion copolymerization of olefinically unsaturated free-radically copolymerizable comonomers.

5. The process of any one of the preceding clauses, wherein the aqueous polyurethane binder of coating composition A is a polyurethane binder dispersion made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender.

6. The process of any one of the preceding clauses, wherein the one or more other binders of coating composition A are selected from aminoplast resins.

7. The process of any one of the preceding clauses, wherein the free polyisocyanate is a mixture of one or more hydrophilic polyisocyanates and one or more conventional polyisocyanates and wherein coating composition A comprises an inert organic solvent.

8. The process of clause 7, wherein the solids weight ratio between the one or more hydrophilic polyisocyanates and the one or more conventional polyisocyanates is about 80:20 to about 50:50.

9. The process of clause 7 or 8, wherein the inert organic solvent comprises or is γ-butyrolactone.

10. The process of any one of the preceding clauses, wherein the binder solids:free polyisocyanate solids weight ratio of coating composition A is about 2.5:1 to about 3.5:1.

11. The process of any one of the preceding clauses, wherein coating composition A comprises about 2 to about 3.5 wt. % of talcum filler, based on the resin solids.

12. The process of any one of the preceding clauses, wherein coating composition B comprises a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, wherein the wt. % are calculated on a solids basis and total 100 wt. %.

13. The process of clause 12, wherein the aqueous (meth)acryl copolymer latex binder of coating composition B is made by free-radical emulsion copolymerization of olefinically unsaturated free-radically copolymerizable comonomers.

14. The process of clause 12 or 13, wherein the aqueous polyurethane binder of coating composition B is a polyurethane binder dispersion made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender.

15. The process of any one of the preceding clauses, wherein the coating layer applied from coating composition A is flashed off within about 30 seconds to about 5 minutes at an air temperature of about 20 to about 30° C.

In the following clauses, exemplary features of the second embodiment are described.

1. A process for the production of a multi-layer coating comprising the successive steps:
applying an about 10 to about 30 µm thick coating layer from an aqueous pigmented coating composition A onto a substrate provided with an EDC primer,
applying an about 10 to about 25 µm thick base coat layer from an aqueous coating composition B onto the previously applied coating layer,
applying an about 30 to about 50 µm thick clear coat layer onto the base coat layer,
jointly bake-curing the three coating layers,
wherein coating compositions A and B are different from each other,
wherein coating composition A comprises (i) binder solids, (ii) free polyisocyanate, (iii) a pigment content free of special effect pigments and comprising carbon black pigment and/or titanium dioxide pigment, and (iv) talcum filler, wherein the free polyisocyanate is a combination of one or more hydrophilic polyisocyanates and one or more conventional polyisocyanates.

2. The process of clause 1, wherein the substrate is an automotive body or an automotive body part.

3. The process of clause 1 or 2, wherein the sum of the coating thickness for the two-layer coating produced from the coating compositions A and B is about 20 to about 35 µm.

4. The process of clause 1, 2 or 3, wherein coating composition A comprises a binder solids consisting of about 10 to about 50 wt. % of aqueous (meth)acryl copolymer latex binder, about 50 to about 90 wt. % of aqueous polyurethane binder and 0 to about 30 wt. % of one or more other binders, wherein the wt. % are calculated on a solids basis and total 100 wt. %.

5. The process of clause 4, wherein the aqueous (meth) acryl copolymer latex binder of coating composition A is made by free-radical emulsion copolymerization of olefinically unsaturated free-radically copolymerizable comonomers.

6. The process of clause 4 or 5, wherein the aqueous polyurethane binder of coating composition A is a polyurethane binder dispersion made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender.

7. The process of clause 4, 5 or 6, wherein the one or more other binders of coating composition A are selected from aminoplast resins.

8. The process of any one of the preceding clauses, wherein coating composition A comprises an inert organic solvent.

9. The process of clause 8, wherein the solids weight ratio between the one or more hydrophilic polyisocyanates and the one or more conventional polyisocyanates is about 80:20 to about 50:50.

10. The process of clause 8 or 9, wherein the inert organic solvent comprises or is γ-butyrolactone.

11. The process of any one of the preceding clauses, wherein the binder solids:free polyisocyanate solids weight ratio of coating composition A is about 2.5:1 to about 3.5:1.

12. The process of any one of the preceding clauses, wherein coating composition A comprises about 2 to about 3.5 wt. % of talcum filler, based on the resin solids.

13. The process of any one of the preceding clauses, wherein coating composition B comprises a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, wherein the wt. % are calculated on a solids basis and total 100 wt. %.

14. The process of clause 13, wherein the aqueous (meth) acryl copolymer latex binder of coating composition B is made by free-radical emulsion copolymerization of olefinically unsaturated free-radically copolymerizable comonomers.

15. The process of clause 13 or 14, wherein the aqueous polyurethane binder of coating composition B is a polyurethane binder dispersion made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender.

16. The process of any one of the preceding clauses, wherein the coating layer applied from coating composition A is flashed off within about 30 seconds to about 5 minutes at an air temperature of about 20 to about 30° C.

In the following clauses, exemplary features of the third embodiment are described.

1. A process for the production of a multi-layer coating comprising the successive steps:
applying an about 10 to about 30 µm thick coating layer from an aqueous pigmented coating composition A onto a substrate provided with an EDC primer,
applying an about 10 to about 25 µm thick base coat layer from an aqueous coating composition B onto the previously applied coating layer,
applying an about 30 to about 50 µm thick clear coat layer onto the base coat layer,
jointly bake-curing the three coating layers,
wherein coating compositions A and B are different from each other,
wherein coating composition A comprises (i) binder solids, (ii) free polyisocyanate, (iii) a pigment content free of special effect pigments and comprising carbon black pigment and/or titanium dioxide pigment, and (iv) talcum filler,
wherein coating composition B comprises a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, wherein the wt. % are calculated on a solids basis and total 100 wt. %.

2. The process of clause 1, wherein the substrate is an automotive body or an automotive body part.

3. The process of clause 1 or 2, wherein the sum of the coating thickness for the two-layer coating produced from the coating compositions A and B is about 20 to about 35 nm.

4. The process of any one of the preceding clauses, wherein the aqueous (meth)acryl copolymer latex binder of coating composition B is made by free-radical emulsion copolymerization of olefinically unsaturated free-radically copolymerizable comonomers.

5. The process of any one of the preceding clauses, wherein the aqueous polyurethane binder of coating composition B is a polyurethane binder dispersion made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender.

6. The process of any one of the preceding clauses, wherein coating composition A comprises a binder solids consisting of about 10 to about 50 wt. % of aqueous (meth)acryl copolymer latex binder, about 50 to about 90 wt. % of aqueous polyurethane binder and 0 to about 30 wt. % of one or more other binders, wherein the wt. % are calculated on a solids basis and total 100 wt. %.

7. The process of clause 6, wherein the aqueous (meth) acryl copolymer latex binder of coating composition A is made by free-radical emulsion copolymerization of olefinically unsaturated free-radically copolymerizable comonomers.

8. The process of clause 6 or 7, wherein the aqueous polyurethane binder of coating composition A is a polyurethane binder dispersion made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender.

9. The process of clause 6, 7 or 8, wherein the one or more other binders of coating composition A are selected from aminoplast resins.

10. The process of any one of the preceding clauses, wherein the free polyisocyanate is a mixture of one or more hydrophilic polyisocyanates and one or more conventional polyisocyanates and wherein coating composition A comprises an inert organic solvent.

11. The process of clause 10, wherein the solids weight ratio between the one or more hydrophilic polyisocyanates and the one or more conventional polyisocyanates is about 80:20 to about 50:50.

12. The process of clause 10 or 11, wherein the inert organic solvent comprises or is γ-butyrolactone.

13. The process of any one of the preceding clauses, wherein the binder solids:free polyisocyanate solids weight ratio of coating composition A is about 2.5:1 to about 3.5:1.

14. The process of any one of the preceding clauses, wherein coating composition A comprises about 2 to about 3.5 wt. % of talcum filler, based on the resin solids.

15. The process of any one of the preceding clauses, wherein the coating layer applied from coating composition A is flashed off within about 30 seconds to about 5 minutes at an air temperature of about 20 to about 30° C.

The following are exemplary embodiments of the processes contemplated herein. The examples are provided for illustration purposes only and are not meant to limit the various embodiments in any way. Used materials:

Latex1 is an acrylic latex of methylmethacrylate-n-butyl acrylate copolymer having an OH-number of 7 mg KOH/g solids (DIN 53240), aqueous dispersion neutralized with 2-Amino-2-methyl-1-propanol and having a solids content of 45 wt. %.

Bayhydrol U 2786 XP (supplied by Bayer MaterialScience) is a polyester-polyurethane dispersion in water and N-ethyl-2-pyrrolidon neutralized with 2-dimethylethanolamine.

Cymel 325 (supplied by Allnex) is a methylated melamine-formaldehyde resin having a solids content of 78 to 82 wt. %.

Maprenal MF 900w/95 (supplied by INEOS) is a hexamethoxymethylamine formaldehyde resin having a molecular weight distribution of 1.20 and a density of 1.21 g/cm³.

PE1 is a polyester dispersion having an OH-number of 77 mg KOH/g solids (DIN 53240) in n-butanol/water (1:1) neutralized with 2-dimethylaminoethanol and having a solids content of 60 wt. %.

PE2 branched polyester hydrophilized with polyethylenglykol-monomethylether having an OH-number of 100 mg KOH/g solids (DIN 53240), an acid number of 7 mgKOH/g solids and a number average molecular weight (GPC, polystyrene standard) of 2500 g/mol (75 wt. % solution in n-Butanol).

PU1 is a waterborne polyurethane dispersion having an acid number of 18 mg KOH/g solids (EN ISO 2114), in water/acetone neutralized with dimethylisoproylamine, solids content 35 wt. %.

PU2 is a waterborne polyurethane dispersion having an acid number of 17 mg KOH/g solids (EN ISO 2114), 39 wt. % in water neutralized with triethylamine.

PU3 is a polyurethane resin having an acid number of 22.5 mg KOH/g solids (EN ISO 2114) in butyl glycol (solids content 70 wt. %).

PU4 is a waterborne polyurethane dispersion (35 wt. % in deionized water, neutralized with triethylamine having an acid number of 18 mg KOH/f solids (EN ISO 2114) and an MEQ Amine no. of 30 meq Amin/100 g solids.
Isocyanate Component:
29.5 wt. % Gamma Butyrolactone,
24.5 wt. % Desmodur N3600, and
46 wt. % Bayhydur 3100.

Galvanized steel plates (Gardobond 26S 6800 OG) were cathodically electrocoated with BASF CathoGuard 800) and cured for 45 min at 205° C. The compositions as indicated in the FIGURE with the indicated talc content were mixed with the isocyanate compound in a volume ratio of 100:10 and applied in a layer thickness of 12 to 15 μm, after 3 minutes of flashing at ambient conditions an additional basecoat layer was applied in a thickness of 12 to 15 μm. The composition used for the additional basecoat layer was as follows:
100 parts by weight of a binder composition comprising
15 wt. % Maprenal MF 900,
10 wt. % Cymel 325,
30 wt. % PU4,
22 wt. % PU2, and
23 wt. % Latex1
were mixed with 25.5 parts by weight of a pigment composition comprising:
72 wt. % aluminium coated with silicon dioxide,
5 wt. % talc, and
24 wt. % layered silicate,
and the overall solids content was 22 wt. %.

After 5 minutes of ambient flash the panels were dried for five minutes at 70° C. Thereafter a two-component clear coat (Supermar, distributed by Axalta) was applied in a layer thickness of 40 to 45 μm and jointly cured at 160° C. for 30 minutes. The obtained coatings were subjected to the stone-chip resistance test according to DIN EN ISO 20567-1, procedure B, and the results are given in the columns of the FIGURE denoted "original".

Moreover, a repair coating was made by re-applying the respective coating composition as indicated in the FIGURE, the additional base coat composition as indicated above and the two-component clear coat onto the coated steel sheets obtained in the previous paragraph in the mentioned thicknesses. The obtained coatings were subjected to the stone-chip resistance test according to DIN EN ISO 20567-1 and the results are given in the respective columns "Rep" of the FIGURE.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for the production of a multi-layer coating, the process comprising the steps of:
applying an about 10 to about 30 μm thick coating layer from an aqueous pigmented coating composition A onto a substrate provided with an EDC primer;

applying an about 10 to about 25 µm thick base coat layer from an aqueous coating composition B onto the coating layer;
applying an about 30 to about 50 µm thick clear coat layer onto the base coat layer; and
jointly bake-curing the three coating layers,
wherein aqueous pigmented coating composition A and aqueous coating composition B are different from each other,
wherein aqueous pigmented coating composition A comprises (i) binder solids (ii) free polyisocyanate, (iii) a pigment content free of special effect pigments and comprising carbon black pigment and/or titanium dioxide pigment, and (iv) talcum filler,
wherein aqueous coating composition B consists essentially of a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, and
wherein the wt. % are calculated on a solids basis and total 100 wt. %.

2. The process of claim 1, wherein aqueous pigmented coating composition A comprises (i) binder solids consisting of about 10 to about 50 wt. % of aqueous (meth)acryl copolymer latex binder, about 50 to about 90 wt. % of aqueous polyurethane binder and 0 to about 30 wt. % of one or more other binders, (ii) free polyisocyanate, (iii) a pigment content free of special effect pigments and comprising carbon black pigment and/or titanium dioxide pigment, and (iv) talcum filler.

3. The process of claim 2, wherein the coating layer applied from aqueous pigmented coating composition A is flashed off within about 30 seconds to about 5 minutes at an air temperature of about 20 to about 30° C.

4. The process of claim 2, wherein the aqueous (meth)acryl copolymer latex binder is made by free-radical emulsion copolymerization of olefinically unsaturated free-radically copolymerizable comonomers.

5. The process of claim 1, wherein aqueous pigmented coating composition A comprises aminoplast resins.

6. The process of claim 1, wherein the free polyisocyanate is a mixture of one or more hydrophilic polyisocyanates and one or more conventional polyisocyanates and wherein aqueous pigmented coating composition A comprises an inert organic solvent.

7. The process of claim 6, wherein the solids weight ratio between the one or more hydrophilic polyisocyanates and the one or more conventional polyisocyanates is about 80:20 to about 50:50.

8. The process of claim 1, wherein the binder solids:free polyisocyanate solids weight ratio of aqueous pigmented coating composition A is about 2.5:1 to about 3.5:1.

9. The process of claim 1, wherein the substrate is an automotive body or an automotive body part.

10. The process of claim 1, wherein the sum of the coating thickness for the two-layer coating produced from the aqueous pigmented coating composition A and the aqueous coating composition B is about 20 to about 35 µm.

11. The process of claim 1, wherein the coating layer applied from aqueous pigmented coating composition A is flashed off within about 30 seconds to about 5 minutes at an air temperature of about 20 to about 30° C.

12. A process for the production of a multi-layer coating, the process comprising the steps of:

applying an about 10 to about 30 µm thick coating layer from an aqueous pigmented coating composition A onto a substrate provided with an EDC primer,
applying an about 10 to about 25 µm thick base coat layer from an aqueous coating composition B onto the previously applied coating layer,
applying an about 30 to about 50 µm thick clear coat layer onto the base coat layer, and
jointly bake-curing the three coating layers,
wherein aqueous pigmented coating composition A and aqueous coating composition B are different from each other,
wherein coating composition A comprises (i) binder solids, (ii) free polyisocyanate, (iii) a pigment content free of special effect pigments and comprising carbon black pigment and/or titanium dioxide pigment, and (iv) 2 to 3.5 wt. % of talcum filler based on total weight of the resin solids,
wherein the free polyisocyanate is a combination of one or more hydrophilic polyisocyanates and one or more conventional polyisocyanates,
wherein aqueous coating composition B consists essentially of a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, and
wherein the wt. % are calculated on a solids basis and total 100 wt. %.

13. The process of claim 12, wherein aqueous pigmented coating composition A comprises (i) binder solids consisting of about 10 to about 50 wt. % of aqueous (meth)acryl copolymer latex binder, about 50 to about 90 wt. % of aqueous polyurethane binder and 0 to about 30 wt. % of one or more other binders, (ii) free polyisocyanate, and (iii) a pigment content free of special effect pigments and comprising carbon black pigment and/or titanium dioxide pigment.

14. The process of claim 12, wherein aqueous pigmented coating composition A comprises an inert organic solvent.

15. The process of claim 12, wherein the solids weight ratio between the one or more hydrophilic polyisocyanates and the one or more conventional polyisocyanates is about 80:20 to about 50:50.

16. A process for the production of a multi-layer coating, the process comprising the steps of:

applying an about 10 to about 30 µm thick coating layer from an aqueous pigmented coating composition A onto a substrate provided with an EDC primer,
applying an about 10 to about 25 µm thick base coat layer from an aqueous coating composition B onto the previously applied coating layer,
applying an about 30 to about 50 µm thick clear coat layer onto the base coat layer, and
jointly bake-curing the three coating layers,
wherein aqueous pigmented coating composition A is a two-component coating composition and aqueous coating composition B is a waterborne base coat composition, such that the aqueous pigmented coating composition A and the aqueous coating composition B are different from each other,
wherein aqueous pigmented coating composition A comprises (i) binder solids, (ii) free polyisocyanate, (iii) a pigment content free of special effect pigments and comprising carbon black pigment and/or titanium dioxide pigment, and (iv) talcum filler, wherein aqueous coating composition B consists essentially of a resin solids composition of about 10 to about 50 wt. % of aqueous (meth)acryl copolymer latex binder, about 5 to about 45 wt. % of aqueous polyurethane binder, about 15 to about 50 wt. % of melamine formaldehyde condensate resin and 0 to about 20 wt. % of one or more other binders, and wherein the wt. % are calculated on a solids basis and total 100 wt. %.

17. The process of claim 16, wherein aqueous pigmented coating composition A comprises (i) binder solids consisting of about 10 to about 50 wt. % of aqueous (meth)acryl copolymer latex binder, about 50 to about 90 wt. % of aqueous polyurethane binder and 0 to about 30 wt. % of one or more other binders, (ii) free polyisocyanate, (iii) a pigment content free of special effect pigments and comprising carbon black pigment and/or titanium dioxide pigment, and (iv) talcum filler.

18. The process of claim 16, wherein the free polyisocyanate is a mixture of one or more hydrophilic polyisocyanates and one or more conventional polyisocyanates and wherein aqueous pigmented coating composition A comprises an inert organic solvent.

19. The process of claim 18, wherein the solids weight ratio between the one or more hydrophilic polyisocyanates and the one or more conventional polyisocyanates is about 80:20 to about 50:50.

* * * * *